(12) United States Patent
Todoroki

(10) Patent No.: US 7,403,684 B2
(45) Date of Patent: Jul. 22, 2008

(54) OPTICAL FUSE AND COMPONENT FOR FABRICATING OPTICAL FUSE

(75) Inventor: Shinichi Todoroki, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 10/578,773

(22) PCT Filed: Nov. 16, 2004

(86) PCT No.: PCT/JP2004/016975

§ 371 (c)(1),
(2), (4) Date: May 9, 2006

(87) PCT Pub. No.: WO2005/050281

PCT Pub. Date: Jun. 2, 2005

(65) Prior Publication Data

US 2007/0122083 A1    May 31, 2007

(30) Foreign Application Priority Data

Nov. 18, 2003    (JP) .............................. 2003-388579

(51) Int. Cl.
*G02B 6/26* (2006.01)
*G02B 6/24* (2006.01)
(52) U.S. Cl. ............................. 385/50; 385/39; 385/140
(58) Field of Classification Search .................. None
See application file for complete search history.

(56) References Cited

U.S. PATENT DOCUMENTS 5,074,635 A * 12/1991 Justice et al. .................. 385/95

(Continued)

FOREIGN PATENT DOCUMENTS

JP    06-201940 A    7/1994

(Continued)

OTHER PUBLICATIONS

Shinichi Todokori et al., "Optical Fuse by Carbon-Coated $TeO_2$ Glass Segment Inserted in Silica Glass Optical Fiber Circuit", Japanese Journal of Applied Physics vol. 43, No. 2B, 2004, pp. L256-L257.

(Continued)

*Primary Examiner*—Hemang Sanghavi
*Assistant Examiner*—Omar Rojas
(74) *Attorney, Agent, or Firm*—Westerman, Hattori, Daniels & Adrian, LLP.

(57) ABSTRACT

Disclosed are an optical fuse and a device for fabricating such an optical fuse. The optical fuse comprises a medium constituting a structure in which a light-emitting end of a first optical waveguide is coupled to a light-incident end of a second optical waveguide across the medium, and a light-absorbing body adapted to absorb the light. The medium is transparent to light passing through the structure, and the light-absorbing body is disposed in contact with an outer peripheral surface of the medium in such a manner as to allow a part of light emitted from the light-emitting end into the medium to reach the light-absorbing body. The optical-fuse fabricating device comprises a pair of first and second support members formed, respectively, with first and second through-holes for supporting an optical fiber, and a beam member mechanically connecting the first and second support members together. When the first and second support members are arranged such that respective axes of the first and second through-holes are aligned in a straight line to allow a single common optical fiber to be inserted into both the first and second through-holes, a spacial gap is formed between the single common optical fiber and the beam. The present invention can provide an optical fuse having a low insertion loss and allowing an optical coupling to be eliminated in response to an irreversible change induced therein, and a device capable of allowing such an optical fuse to be fabricated in a simple and easy way.

6 Claims, 3 Drawing Sheets

U.S. PATENT DOCUMENTS

| | | | | |
|---|---|---|---|---|
| 5,191,167 | A | * | 3/1993 | Beyer .................. 102/201 |
| 6,218,658 | B1 | * | 4/2001 | Taneda et al. .............. 250/216 |
| 6,415,075 | B1 | | 7/2002 | DeRosa et al. |
| 6,612,753 | B1 | * | 9/2003 | Cryan et al. .................. 385/96 |
| 2002/0076148 | A1 | | 6/2002 | DeRosa et al. |
| 2005/0111782 | A1 | | 5/2005 | Donval et al. |
| 2007/0127870 | A1 | * | 6/2007 | Oron et al. .................. 385/38 |

FOREIGN PATENT DOCUMENTS

| | | |
|---|---|---|
| JP | 9-146056 | 6/1997 |
| JP | 09-297286 A | 11/1997 |
| JP | 11-109427 | 4/1999 |
| JP | 11-274547 | 10/1999 |
| JP | 11-281803 | 10/1999 |
| JP | 11-281842 | 10/1999 |
| JP | 3169885 | 3/2001 |
| JP | 2002-221740 | 8/2002 |
| WO | WO 03/058338 A2 | 7/2003 |
| WO | WO 03/076971 A2 | 9/2003 |

OTHER PUBLICATIONS

Shinichi Todoroki et al., "Observation of Blowing out in Low Loss Passive Optical Fuse Formed in Silica Glass Optical Fiber Circuit", Japanese Journal of Applied Physics vol. 43, No. 6A, 2004, pp. L728-L730.

International Search Report mailed Mar. 8, 2005 of International Application PCT/JP2004/016975.

* cited by examiner

OPTICAL FUSE AND COMPONENT FOR FABRICATING OPTICAL FUSE

TECHNICAL FIELD

The present invention relates to an optical fuse which is one component of an optical circuit, and a device for fabricating such an optical fuse.

BACKGROUND ART

In connection with popularization of high-power light sources, there is a growing need for a protective device capable of protecting an optical system from an excessive light input. An optical fuse is one type of such protective devices. The optical fuse has a function of cutting off an optical line or restricting an amount of light passing therethrough in response to an excessive input, in a manner similar to a fuse incorporated in most electric products.

Previously proposed optical fuses have been designed such that a medium for causing a light loss is inserted into an optical line, wherein the medium includes a material in which an irreversible change is to be induced in response to excessive light entered therein (see, for example, the following Patent Publications 1 to 3). In this structure, the medium is arranged at a position where entire light traveling along the optical line passes therethrough, so that the optical fuse function is achieved based on an increase in insertion loss of the medium to be caused by an excessive light input. This structure has a disadvantage about inherently large insertion loss due to relatively high light-absorbance capacity of the irreversibly-changeable material.

An optical limiter is known as a device with a similar structure to that of the optical fuse. The optical limiter is designed to attenuate light in response to an excessive light input and allow only a given amount of light to pass therethrough, wherein an insertion loss is increased in response to an excessive input by utilizing a reversible phenomenon (see, for example, the following Patent Publications 4 and 5). As with the structure of the optical fuse, the optical limiter has a medium arranged at a position where entire light traveling along an optical line passes therethrough, and a material having a nonlinear optical effect or a light-absorbing material is used in the medium. Thus, this structure also has a disadvantage about inherently large insertion loss.

Another disadvantage of the conventional optical fuse is that a light output cannot be completely cut off because a light input port is optically coupled to a light output port even after the irreversible change is induced. Specifically, when an excessive light input continues for a long period of time, even attenuated light can keep providing some light output to result in continuous supply of light energy to a downstream side of the optical fuse.

Additionally, other related techniques for achieving an optical limiter will be described below together with a discussion thereabout. There has been known one technique in which two light waveguides are arranged in opposed relation to one another without interposing therebetween the medium used in the aforementioned techniques, and then moved apart from one another in response to increase in intensity of light traveling along an optical line so as to restrict an amount of light passing across the two light waveguides. As disclosed, for example, in the following Patent Publication 6, a core and clad of an optical waveguide are made of materials different in temperature coefficient of thermal expansion, and the core is arranged at a position displaced from the center of the clad, so that the optical limiter function is achieved by utilizing a phenomenon that the optical waveguide is deformed by heat generated therein due to an increase in intensity of light traveling along an optical line.

Alternatively, the core and clad are made of materials different in temperature coefficient of refractive index, and the optical wave guide is arranged in a bent state, so that the optical limiter function is achieved by utilizing a phenomenon that a light confinement effect of the optical waveguide is lowered by heat generated therein due to an increase in intensity of light traveling along an optical line, whereby an amount of light leakage is increased. While the above phenomenon utilizing a difference between respective temperature coefficients of the core and clad materials is based on a reversible change, it is readily understood that an optical fuse can be achieved by replacing such phenomenon with a phenomenon inducing an irreversible change. An amount of deformation or light leakage of the optical waveguide in this technique is sufficient to increase a desired insertion loss but not to eliminate an optical coupling. Thus, this technique also has a disadvantage about difficulty in completely cutting off a light output.

As above, the conventional optical fuses have problems about relatively large insertion loss in a normal state, and undesirable continuation of an optical coupling in a state after an irreversible change is induced. While KiloLambda Technologies, Ltd., USA, announced a sales plan of a low-loss optical fuse on Mar. 17, 2003, its technical content has not been known so far.

Patent Publication 1: Japanese Patent Laid-Open Publication No. 2002-221740 (Optical Fuse Device)

Patent Publication 2: Japanese Patent No. 3169885 (Optical Fuse)

Patent Publication 3: Japanese Patent Laid-Open Publication No. 11-281842 (Optical Fuse, Optical Fuse Composite Structure and Optical Fuse Device comprising Same)

Patent Publication 4: Japanese Patent Laid-Open Publication No. 11-109427 (Optical Waveguide Type Light-Intensity Attenuation Element)

Patent Publication 5: U.S. Pat. No. 6,415,075 (Potothermal Optical Signallimiter)

Patent Publication 6: WO 03/058338 (Optical Limiter)

DISCLOSURE OF THE INVENTION

Problem to be Solved by the Invention

It is a first object of the present invention to provide an optical fuse having an low insertion loss, and a device for fabricating such an optical fuse. It is a second object of the present invention to provide an optical fuse capable of eliminating an optical coupling after an irreversible change is induced, and a device for fabricating such an optical fuse.

Means for Solving the Problem

The first object is achieved as follows: a medium to be inserted into an optical line in which a light-emitting end of a first optical waveguide is coupled to a light-incident end of a second optical waveguide across the medium is made of a material transparent to light traveling along the optical line; and an outer peripheral surface of the medium is covered by an additional light-absorbing medium or a light-absorbing body in a contact manner so as to allow a part of light emitted from the light-emitting end into the medium to reach the light-absorbing body.

The second object is achieved as follows: at least one of the first and second light waveguides in contact with the medium consists of an optical fiber, and a retention portion for fixing the optical fiber is disposed away from an interface between the medium and the light-emitting end comprised of the optical fiber, in such a manner as to allow a zone of the optical fiber between the retention portion and the interface to be bent.

The first object is also achieved by fabricating an optical fuse using a device which comprises a pair of first and second support members formed, respectively, with first and second through-holes for supporting an optical fiber, and a beam member mechanically connecting the first and second support member together, wherein the first and second support members are arranged such that respective axes of the first and second through-holes are aligned in a straight line to allow a single common optical fiber to be inserted into both the first and second through-holes, a spacial gap is formed between the single common optical fiber and the beam member. Further, the second object is achieved by forming a groove at an intermediate position of the beam member of the device.

EFFECT OF THE INVENTION

The optical fuse of the present invention is designed to separate the medium as a portion playing a role in an optical coupling, from the light-absorbing body as a portion in which an irreversible change is to be induced (for inducing an irreversible change in the medium), or an irreversibly changeable portion. This provides an effect of being able to suppress an increase in insertion loss in a normal state. In addition, the optical fuse of the present invention has an effect of being able to eliminate an optical coupling in a state after an irreversible change is induced. The optical fuse-fabricating device has an effect of being able to allow such an optical fuse to be fabricated in a simple and easy way.

BEST MODE FOR CARRYING OUT THE INVENTION

Figure 1:
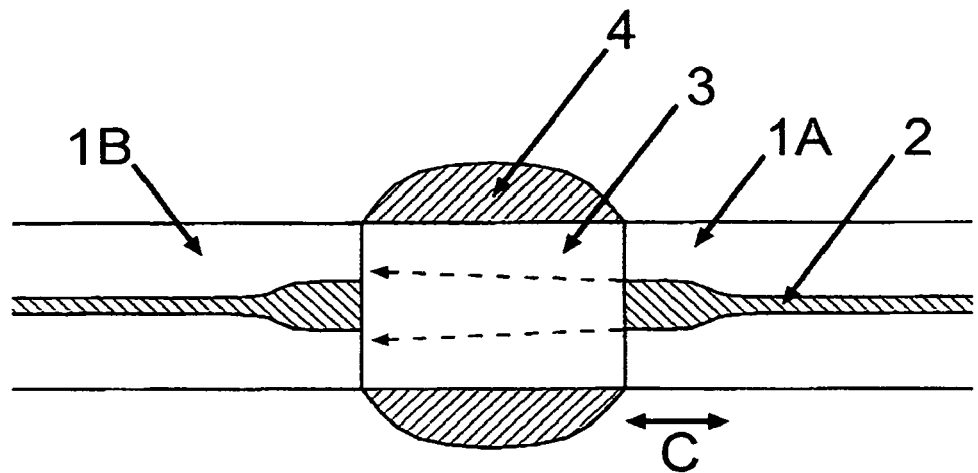
FIG. 1 is an explanatory sectional view showing the structure of an optical fuse according to one embodiment of the present invention.
Figure 1:
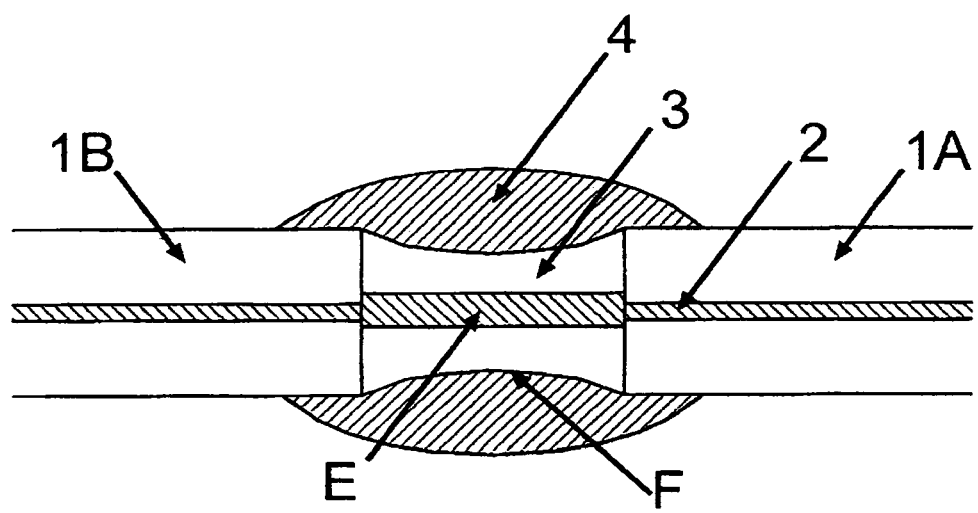

An optical fuse according to one embodiment of the present invention for achieving the aforementioned first object is shown on the upper side of FIG. 1 in the form of a sectional view. The reference numerals 1A and 1B indicate, respectively, first and second optical waveguides. Specifically, each of the optical waveguides consists of an optical fiber or a planar waveguide. The reference numeral 2 indicates a modified region in refractive index provided as a means to transmit light while confining the light in the optical waveguides, or a core. The reference numeral 3 indicates a medium transparent to light transmitted along the optical waveguides. A light-emitting end of the first optical waveguide 1A is optically coupled to a light-incident end of the second optical waveguide 1B across the medium 3, i.e. while interposing the medium 3 therebetween. One example of a propagation path of light in the medium 3 is indicated by two arrowed dotted lines. While most of the light travels through a region between the two dotted lines, there is a part of the light traveling out of this region.

The reference numeral 4 indicates a light-absorbing body capable of absorbing a part of light emitted from the light-emitting end into the medium and generating heat or igniting. This light-absorbing body 4 is in contact with an outer peripheral surface of the medium 3. Light reaching the light-absorbing body 4 includes light coming directly from the light-emitting end and light coming from the light-incident end after being reflected thereby. The light-absorbing body may cover at least a portion of the outer peripheral surface of the medium 3. This covered area may be determined depending on how much the part of transmitted light is introduced to the light-absorbing body, according to a common practice of design. However, in view of effectively inducing an irreversible change in the medium 3, it is desirable to increase the covered area.

When an intensity of light passing through the medium is increased, an amount of light reaching the light-absorbing body 4 is increased, and thereby an amount of heat generated in the light-absorbing body 4 is increased. This heat generation causes an increase in temperature of the medium 3. When the temperature reaches a softening point of the medium 3, a surface tension acts on the medium 3, and the medium 3 is changed to have a shape with a smaller surface area or dropped down by the action of gravity. Thus, a deformation is induced in the structure optically coupling between the first and second optical waveguides 1A, 1B. If the medium 3 is made of an amorphous material, the medium 3 will be changed to a polycrystalline substance when a temperature thereof reaches a crystallization point, to cause an increased in loss due to light scattering. If the light-absorbing body 4 is an explosive, the medium 3 will be blown out. Preferably, the optical waveguides 1A, B are made of a material in which softening or crystallization is not induced by the above heat generation. In other words, it is preferable that the medium 3 is made of a material having stability against heating, which is inferior to that of the optical waveguides 1A, B.

In this way, an irreversible change is induced when an intensity of light passing through the medium 3 becomes greater than a given value, so that an optical fuse capable of reducing an intensity of light to be transmitted from the first optical waveguide 1A to the second optical waveguide 1B can be achieved. In a normal state or a state before the irreversible change is induced, light transmitted to the second optical waveguide 1B passes through the medium 3 transparent to the light. Thus, this optical fuse can have a lower insertion loss than that of the conventional optical fuse.

A critical light intensity inducing an irreversible change would be determined by the following factors: (1) a ratio of an amount of light reaching the light-absorbing body to the total amount of light passing through the medium, or the level of light confinement in the medium or a shape of the medium; (2) a photothermal conversion efficiency of the light-absorbing body; and (3) a high deformability or crystallizability of the medium in response to an increase in temperature thereof.

As to the factor (1), in the optical fuse illustrated on the upper side of FIG. 1, a zone C of the core 2 of the first optical waveguide 1A is enlarged as compared to the remaining zone, to serve as a convex lens for converging light traveling inside the medium 3. A light converging effect of this convex lens may be adjusted to control the critical light intensity. This enlarged zone of the core may be eliminated to increase an amount of light reaching the light-absorbing body 4.

Instead of forming the enlarged zone, a light confinement structure E may be formed in the medium, as shown on the lower side of FIG. 1. In this case, the light confinement structure E is required to have a lower light confinement effect than that of the optical waveguides, because a part of light passing through the medium must reach the light-absorbing body. The light confinement structure E may be formed using a technique of bonding the medium 3 provided light confinement structure to the waveguides 1A, 1B or a technique of focusing a pulsed laser light on an inner portion of the medium 3 to increase a refractive index of the inner portion (see K. M. Davis, K. Miura, N. Sugimoto, K. Hirao, Opt. Lett. 21 (1996) 1729-1731).

Further, the medium 3 may be formed to have an outer peripheral surface F which is gradually constricted toward a longitudinally intermediate position thereof, as shown on the lower side of FIG. 1. This structure allows the light-absorbing body 4 to be located at a position closer to a propagation region (e.g. the region between the dotted lines in the optical fuse illustrated on the upper side of FIG. 1) of light traveling inside the medium 3, so as to increase an amount of light reaching the light-absorbing body 4 to lower the critical light intensity. The constricted portion is not essential to have a longitudinally symmetric shape, but the most constricted portion may be located at any position in a zone between the light-emitting end and the light-incident end. In other words, the medium 3 may have a minimum cross-sectional area orthogonal to a propagation direction of light therein, at any position located in a zone of the medium 3 interposed between the light-emitting end and the light-incident end.

When a material which has a lower softening temperature or which is easy to crystallize by heating, as compared to the optical waveguides 1A, 1B, which is easy to crystallize is selected for the medium 3, as described above, the medium 3 generally has a lower strength than that of the optical waveguides 1A, 1B. In this case, as in the optical fuse illustrated on the lower side of FIG. 1, the light-absorbing body may be formed to cover a portion of the optical waveguides 1A, 1B, and mixed with a material having adhesiveness in an amount enough to keep from hindering the photothermal conversion function thereof, to reinforce this structure in its entirely. That is, the optical fuse may be designed such that the light-absorbing body 4 mechanically connects between the optical waveguides 1A, 1B firmly to compensate for a relatively low strength of the medium 3 in a state before the light-absorbing body 4 generates heat, and then the reinforcement effect based on the light-absorbing member is lowered in response to heat generation in the light-absorbing body 4 to facilitate deformation of the medium 3.

Typically, the light-absorbing body 4 is formed by depositing a liquid mixture, such as a coating material, through a coating process or a spraying process, and then hardening the mixture through a drying process, a heating process or an ultraviolet radiation process. Specifically, the liquid mixture for forming the light-absorbing body 4 comprises the following materials.

(a) A material capable of absorbing light from the medium 3 and generating heat. For example, this material includes: carbon; explosive; organic material containing lots of double bonds, triple bonds or benzene rings; graphite; fullerene; carbon nanotube; and derivatives thereof. Further, a material capable of spreadingly burning around an initially ignited position thereof, or a material capable of continuously spreading a chemical reaction from a position of thereof where the chemical reaction initially occurs may be effectively used. For example, such a material includes a mixture of magnesium powder and carbon, and a mixture of sulfur and iron.

(b) a material having flowability and hardenability through a drying process, a heating process or an ultraviolet radiation process. For example, this material includes: gum arabic; paste; glue; thermo-setting resin; and UV-setting resin. While a readily-available liquid mixture meeting this requirement includes a black color (watercolor, oil color, acrylic color, lacquer or paint), any other suitable material meeting the above requirement may be used.

In connection with the aforementioned factor (3), the medium 3 may be made of a material having a lower softening temperature than that of the optical waveguides 1A, 1B, or may be made of a material which is easy to crystallize by heating. This makes it possible to increase an insertion loss of the medium sensitively in response to heat generation in the light-absorbing body 4 so as to lower the critical light intensity. If the optical waveguides 1A, 1B is made of silica glass having a softening temperature of 1600° C. or more and a significantly low crystallizability against heating, the medium 3 may be made of glass other than silica glass or resin. For example, a glass having a particularly high crystallizability includes a glass containing a less amount of glass-forming oxide ($SiO_2$, $B_2O_3$, $P_2O_5$, $GeO_2$, $As_2O_3$), a glass containing no glass-forming oxide, and a glass consisting of a composition including $TeO_2$, halide and/or sulfide.

Figure 2:
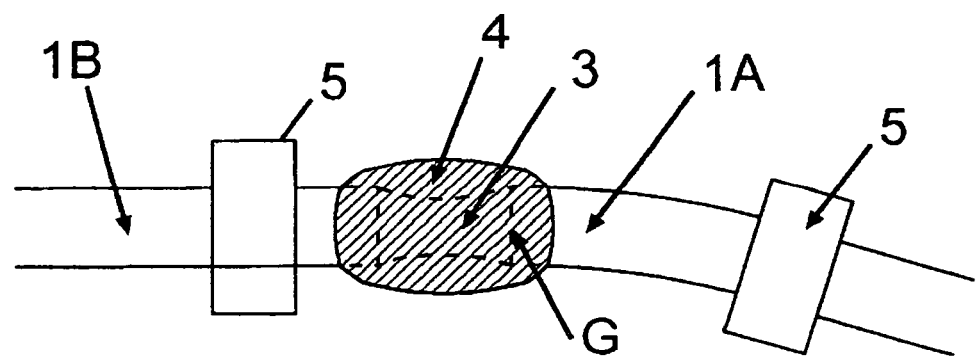
FIG. 2 is an explanatory external view showing the structure of an optical fuse according to another embodiment of the present invention.

An optical fuse according to another embodiment of the present invention for achieving the aforementioned second object is shown in FIG. 2. The reference numeral 5 indicates a fixing member for fixing each of two optical waveguides to an adjacent structure (not shown) disposed around the optical waveguides. Alternatively, each of the optical waveguides may be fitted into a V-shaped groove (not shown) formed in the adjacent structure, and fixed with adhesive. One of the optical waveguides on the right side of FIG. 2 consists of an optical fiber 1A, and a zone of the optical fiber extending from the right fixing member 5 to an interface G between a light-emitting end (or light-incident end) of the optical fiber and a medium 3 is in a bent state. This bent state can be achieved by forming the structure as described in connection with FIG. 1, and then bending and fixing the optical fiber. It should be noted that the optical fiber does not have a bent shape in advance. Thus, a certain stress is applied to the medium. A minimum level of the bending is set to the extent that, in a state after the medium 3 and a light-absorbing body 4 are removed from the structure or in a state illustrated in FIG. 3, an optical coupling between the optical waveguides 1A, 1B is eliminated. If it is not required to eliminate the optical coupling, the level of the bending may be reduced. A maximum level of the bending is set to the extent that a stress applied to the medium 3 and the light-absorbing body 4 in response to the bending never causes breaking therein.

Figure 3:
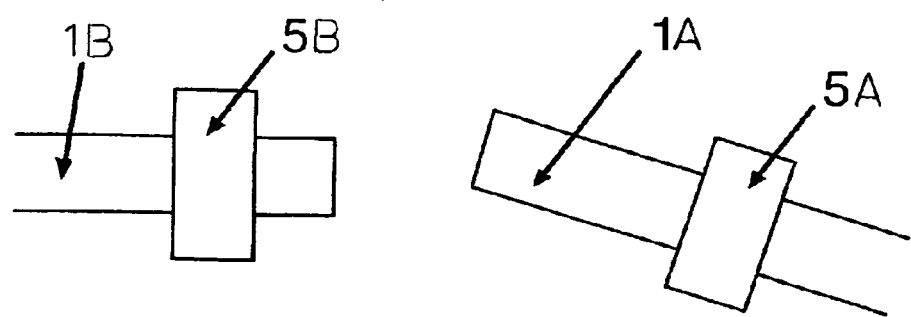
FIG. 3 is an explanatory external view showing a positional relationship between optical waveguides in a state after the optical fuse illustrated in FIG. 2 is activated.

When light exceeding the critical light intensity is entered into the medium in this bent state, an irreversible change is induced in the medium, and the previously-applied stress will facilitate deformation of the medium. Then, the optical fiber 1A moves to eliminate the bending, and the optical waveguide 1B on the left side of FIG. 2 and the optical fiber 1A on the right side of FIG. 2 finally have a positional relationship as shown in FIG. 3 to eliminate the optical coupling therebetween. In FIG. 3, the medium and the light-absorbing body are omitted. If both of the right and left optical waveguides are composed of an optical fiber, and bent, the same effect can be obtained.

Figure 4:
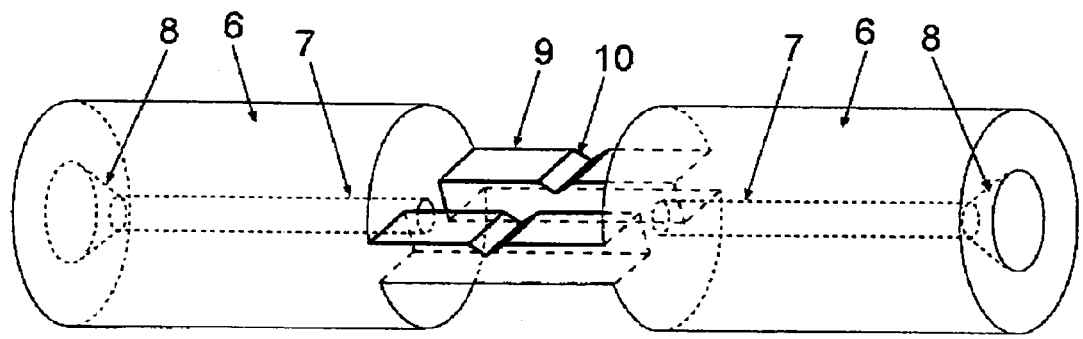
FIG. 4 is an explanatory perspective view showing the structure of an optical fuse-fabricating device according to one embodiment of the present invention.

An optical fuse-fabricating device according to one embodiment of the present invention for achieving the aforementioned first object is shown in FIG. 4 in the form of a perspective view. The reference numeral 6 indicates a pair of right and left support members formed, respectively, with right and left through-holes 7 each having an inner diameter slightly greater than an outer diameter of an optical fiber. The pair of support members 6 are mechanically connected together through a pair of beam members 9. Each of the beam members 9 is arranged such that, when respective axes of the right and left through-holes are aligned in a straight line to allow a single common optical fiber to be inserted into both the right and left through-holes 7, a spacial gap is formed between the single common optical fiber and the beam member. The reference numeral 8 indicates a reverse-tapered portion for guiding a front end of an optical fiber to one of the through-holes 7 during an operation for inserting the optical fiber into the through-hole 7. The reverse-tapered portion 8 is not essential for the present invention. The reference numeral 10 indicates a groove formed in each of the beam members at a longitudinally intermediate position thereof. While the groove 10 is not essential for the device to be designed to achieve the first object, it is essential for an after-mentioned device to be designed to achieve the second object.

Figure 5A:
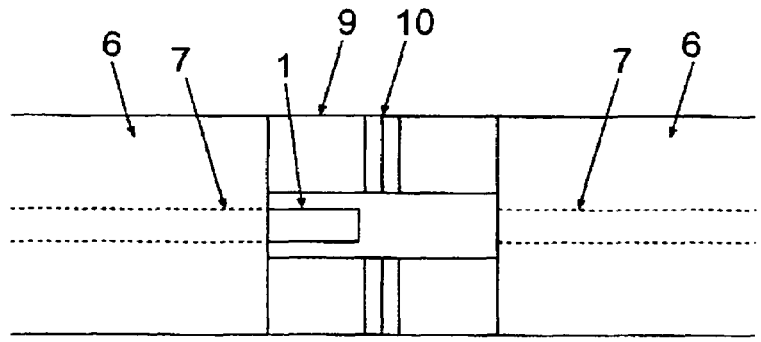
FIGS. 5(a) to 5(c) are explanatory process diagrams showing a process for fabricating an optical fuse using the optical fuse-fabricating device illustrated in FIG. 4.
Figure 5B:
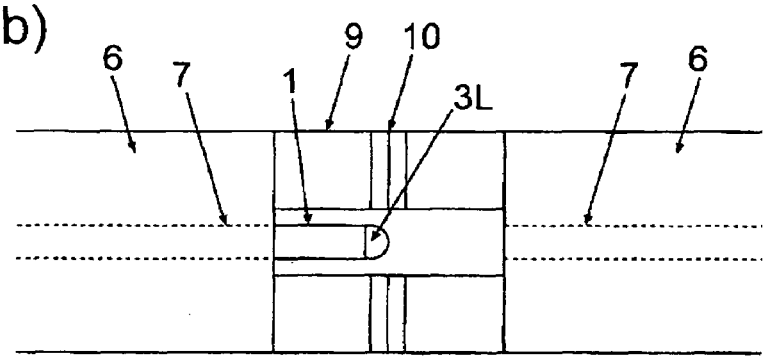
Figure 5C:
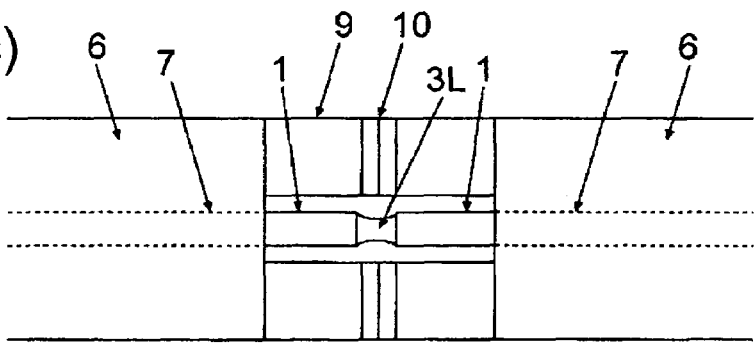

With reference to FIGS. 5(a) to 5(c), a process of fabricating an optical fuse using this device will be described. Firstly, as shown in FIG. 5(a), an optical fiber 1 is inserted into the left through-hole 7 to allow an edge of the optical fiber 1 to be located in a space between the right and left support members 6 without contacting each of the beam members 9. The optical fiber 1 is then fixed to the left support member 6 by use of an adhesive or the like. Then, as shown in FIG. 5(b), a liquid 3L for forming the medium 3 is attached onto the edge of the optical fiber 1. In this operation, if the edge of the optical fiber 1 is in contact with either one of the beam members, the liquid 3L will undesirably spread through the beam members. Thus, it is required to avoid such a contact. In other words, it is required to arrange the beam members 9 in such as manner as to reliably form a gap which allows the operation for attaching the liquid 3L onto the edge of the optical fiber 1 to be performed without any difficulty.

When the medium 3 is made of UV-setting resin or thermosetting resin, such a resin in liquid form or pre-hardened form is used as the liquid 3L. The operation for attaching the liquid 3L onto the edge of the optical fiber 1 may be performed by attaching the liquid 3L onto an edge of a wire having a diameter equivalent to that of the optical fiber, and then transferring the liquid 3L from the edge of the wire to the edge of the optical fiber 1, or by holding the liquid 3L in a capillary tube or an injector and then transferring the liquid 3L from the capillary tube or injector to the edge of the optical fiber 1. When the medium 3 is made of glass, a heated molten glass is used as the liquid 3L. In this case, it is required to take measures for heating the molten glass to prevent solidification thereof. A small amount of molten glass may be transported using a method and apparatus disclosed, for example, in Japanese Patent Laid-Open Publication No. 2003-31734 (Method and Apparatus for producing Glass Composite Material).

Subsequently, as shown in FIG. 5(C), another optical fiber 1 is inserted into the right through-hole 7 to bring an edge thereof into contact with the liquid 3L. Then, the liquid 3L is hardened. When the liquid 3L is UV-setting resin or thermosetting resin, it is exposed to ultraviolet radiation or subjected to a heat treatment. When the liquid 3L is a heated molten glass, it is cooled. Subsequently, a light-absorbing body 4 is formed on an outer peripheral surface of the formed medium 3 in a contact manner through the aforementioned process. Through the above process, a structure equivalent to the structure illustrated in FIG. 1 can be fabricated.

Figure 6:
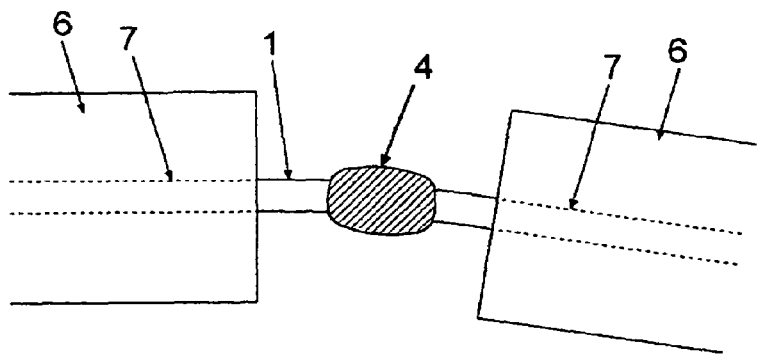
FIG. 6 is an explanatory external view showing a final state of the optical fuse fabricated using the optical fuse-fabricating device illustrated in FIG. 4.

An optical fuse-fabricating device for achieving the second object will be described below. This device corresponds to the above device in which the groove 10 is formed in each of the beam members at a longitudinally intermediate position thereof. An optical fuse is fabricated using this device through the aforementioned process. In this process, it is required to form the light-absorbing member without contacting each of the beam members 9. Then, a certain force is applied to the entire device to bend the device in a dogleg shape having an apex located at the grooves 10. The bent structure is shown in FIG. 6, wherein the beam members 9 with the grooves 10 are omitted. This structure has the same effect as that of the structure illustrated in FIG. 2.

If the light-absorbing body 4 is in contact with one or both of the beam members 9, the bending force is also applied to the light-absorbing body 4 and the medium 3 to cause the risk of breaking therein. Thus, it is required to avoid such a contact. In other words, it is required to arrange the beam members 9 in such as manner as to reliably form a gap which allows the operation for forming the light-absorbing body 4 on the outer peripheral surface of the medium 3 without any difficulty.

While the above device is not limited to a specific material, the above device is typically made of resin, polymer, glass or crystallized glass, in view of formability. When glass or crystallized glass is used, the beam members 9 have cracks developed from the grooves 10. However, the structure can be fixed in the state illustrated in FIG. 6 without problems, as long as the mechanical connection between the medium 3 and the right and left optical fibers is maintained.

EXAMPLE 1

A light-emitting end of one optical fiber and a light-incident end of another optical fiber were arranged in opposed relation to one another, and a small amount of $TeO_2$ molten liquid was inserted between the two ends. The inserted molten liquid was formed to allow an intermediate portion thereof to be constricted, and then cooled. This shape was formed by scraping a part of the liquid droplet using the two optical fibers. This technique is disclosed in Japanese Patent Laid-Open Publication No. 2003-57482 (Method and Apparatus for fabricating Glass Composite Material). When light was entered from one of the optical fibers, a light output was observed from the other optical fiber. Thus, it could be verified that an optical coupling was established through a medium composed of the transparent $TeO_2$ glass interposed between the optical fibers. Then, a commercially available black water color was applied onto an outer peripheral surface of the $TeO_2$ glass medium to cover over the outer peripheral surface. Water was removed from the water color, and the water color was dried to form a light-absorbing body on outer peripheral surface of the $TeO_2$ glass medium in a contact manner. It is said that a black water color typically has a primary component of carbon powder, gum arabic and water.

One of the optical fibers was connected to a fiber laser with a wavelength of 1520 mm, and the laser was launched to monitor a light output intensity relative to a light input intensity, or an insertion loss. Even when a laser intensity was gradually increased, the insertion loss was not changed.

When the portion coated with the black water color was observed while further increasing the laser intensity, the portion having the $TeO_2$ glass suddenly ignited, and then the water color around the ignited portion burnt. Simultaneously, an insertion loss value was increased. The $TeO_2$ glass medium and the water color-based light-absorbing body which have resided between the ends of the optical fibers were varnished, and the optical coupling between the optical fibers was eliminated. In contrast, when a leaser light was entered into a structure without the water color coating, in the same manner as that described above, no change was observed in the $TeO_2$ glass portion.

INDUSTRIAL APPLICABILITY

The optical fuse of the present invention has a low insertion loss in a normal state, and allows an optical coupling to be eliminated in a state after an irreversible change is induced therein. Thus, the optical fuse of the present invention is useful as a device for protecting an information-communication apparatus susceptible to optical damages due to high-intensity light. In particular, the optical fuse and the optical fuse-fabricating device for the optical waveguides 1A, 1B each consisting of an optical fiber have high usability, because the optical fuse can be inserted into an existing optical fiber line, and the device can facilitate the insertion operation.

What is claimed is:

1. An optical fuse comprising:
   a medium constituting a structure in which a light-emitting end of a first optical waveguide is coupled to a light-incident end of a second optical waveguide across said medium, said medium being transparent to light passing through said structure; and
   a light-absorbing body to absorb a portion of said light and generate heat to cause irreversible change to said medium by increased heat generation of said light-absorbing body when light intensity passing through said medium exceeds a critical light intensity, said light-absorbing body contacting at least a portion of an outer peripheral surface of said medium in such a manner as to allow a part of light emitted from said light-emitting end into said medium to reach said light-absorbing body,
   wherein light-absorbing body is located outside of propagation region of light travelling inside the medium, and wherein the optical fuse is for an optical circuit which transmits light while confining the light in the optical waveguides.

2. The optical fuse as defined in claim 1, wherein said medium is formed to allow a cross-sectional area orthogonal to a propagation direction of light therein to have a minimum value at a position located in a zone of said medium interposed between said light-emitting end and said light-incident end.

3. The optical fuse as defined in claim 1 or 2, wherein at least one of said first and second light waveguides consists of an optical fiber, and said structure includes a fixing member for fixing said optical fiber, said fixing member being disposed away from an interface between said medium and said light-emitting or light-incident end comprised of said optical fiber, in such a manner as to allow a zone of said optical fiber between said fixing member and said interface to be bent.

4. The optical fuse as defined in claim 1, wherein said medium is an amorphous material and said irreversible change is crystallization of said medium.

5. An optical fuse comprising:
   a medium constituting a structure in which a light-emitting end of a first optical waveguide is coupled to a light-incident end of a second optical waveguide across said medium, said medium being transparent to light passing through said structure; and
   a light-absorbing body to absorb a portion of said light and ignite to cause irreversible change to said medium when light intensity passing through said medium exceeds a critical light intensity, said light-absorbing body contacting at least a portion of an outer peripheral surface of said medium in such a manner as to allow a part of light emitted from said light-emitting end into said medium to reach said light-absorbing body,
   wherein light-absorbing body is located outside of propagation region of light travelling inside the medium, and wherein the optical fuse is for an optical circuit which transmit light confining in the optical waveguides.

6. The optical fuse as defined in claim 5, wherein said light-absorbing body is an explosive and said irreversible change is destruction of said medium.

* * * * *